3,065,002
RELEASABLE COUPLING FOR SHEET METAL VENT PIPES
Robert J. Waalkes and Edward T. Kuhtic, Holland, Mich., assignors to Hart & Cooley Manufacturing Co., Holland, Mich., a corporation of Delaware
Filed Mar. 31, 1959, Ser. No. 803,165
7 Claims. (Cl. 285—315)

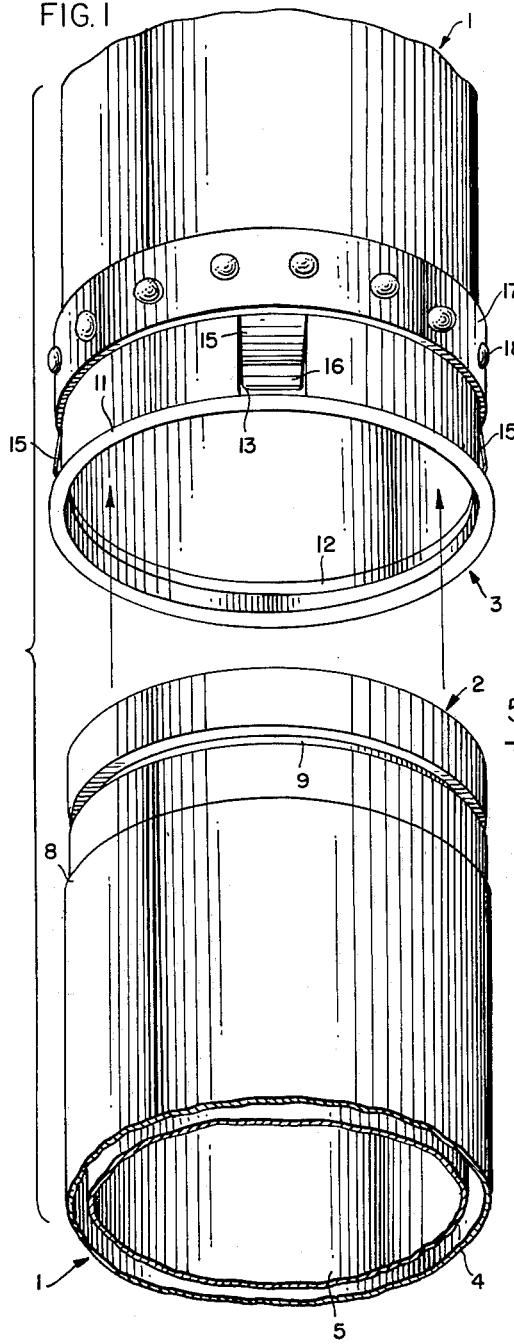
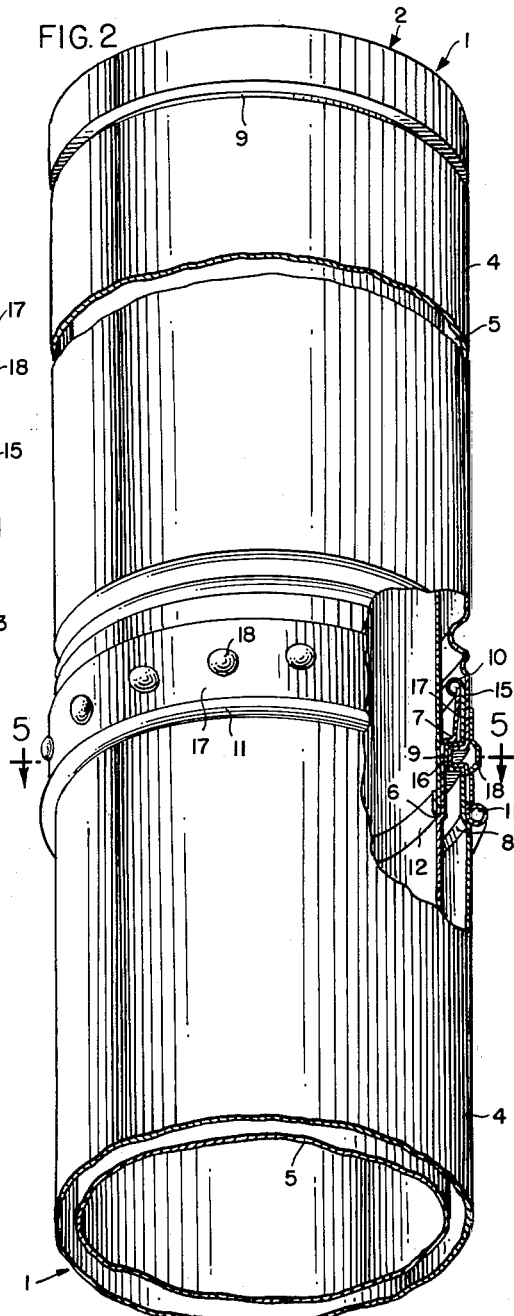

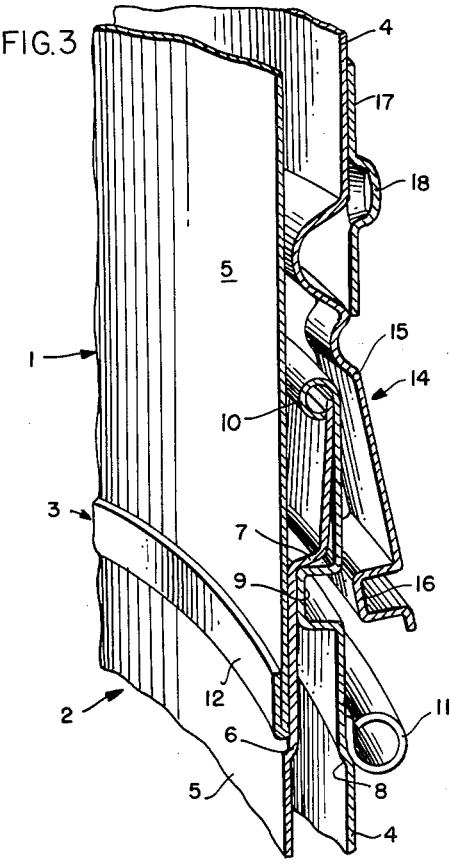
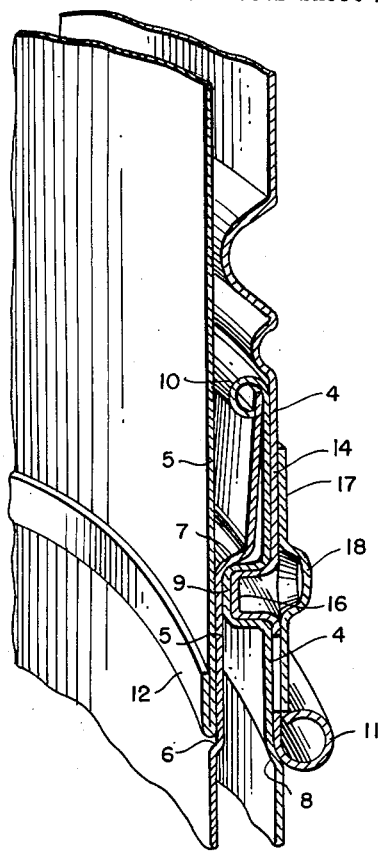
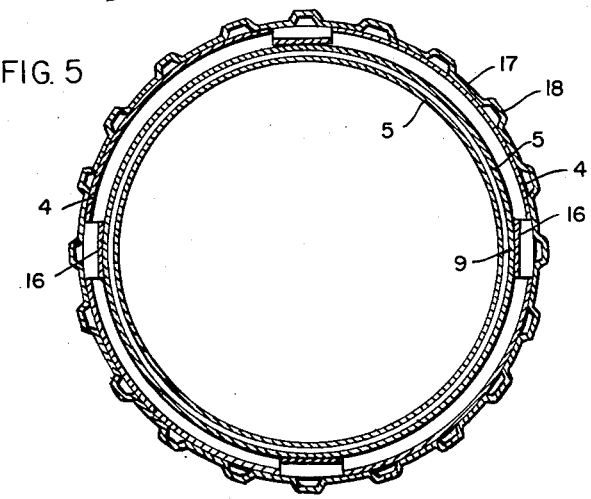
INVENTORS:
ROBERT J. WAALKES
EDWARD T. KUHTIC

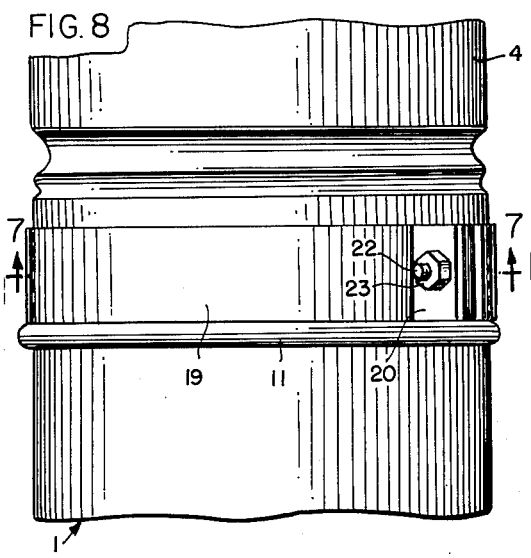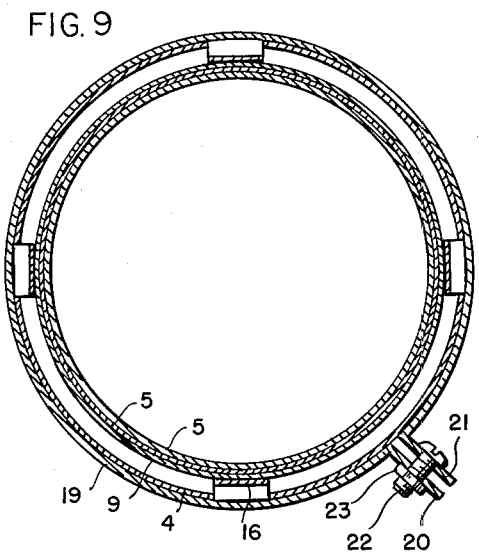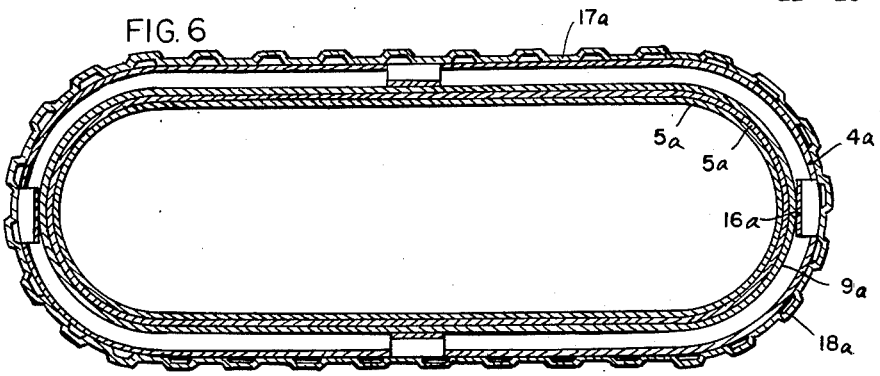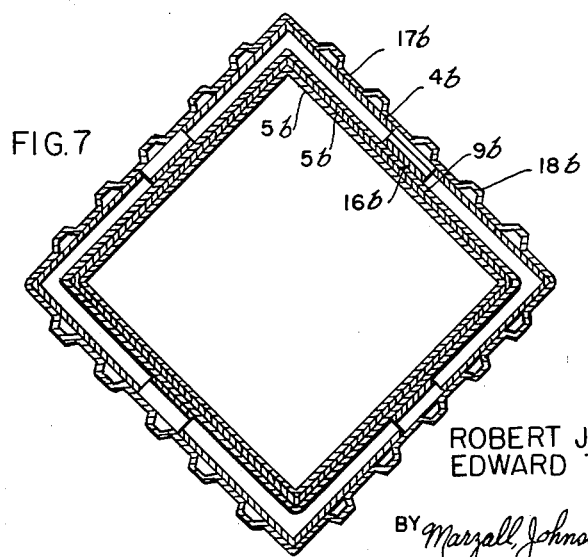
INVENTORS:
ROBERT J. WAALKES
EDWARD T. KUHTIC United States Patent Office 3,065,002
Patented Nov. 20, 1962

This invention relates in general to improvements in pipe couplings and is particularly adapted for use in connection with flue or vent pipes which may have either a single- or a doubled-walled construction.

In the past many different types of coupling arrangements have been used for securing together adjacent pipe sections. In the field of vent pipes it is customary to use a double walled construction for the purpose of reducing or eliminating a fire hazard which may be present due to the hot flue gases in the pipes.

Initially, such pipe sections were secured or coupled together by crimping one end, so that it would fit into the end of an adjacent pipe section, and then using either metal screws or small bolts inserted through openings in the two pipe sections. This method is obviously time-consuming and on occasion it may be difficult to install the pipes where they have to be locked in a relatively inaccessible place.

It may be possible in some installations to allow the two adjacent pipe sections to be held together merely by a friction fit. This, however, is unsafe when the possibility of two adjacent sections becoming separated is considered.

Another form of coupler which has been used involves a rotatable band which, when rotated, causes a plurality of tongues to be cammed inwardly into locking engagement with a groove on the end of an adjacent pipe section. This type of coupler, however, also has the disadvantage that when several pipe sections have been thus coupled together, the rotation of a band on the one pipe section to locking position may conceivably cause the rotation of the pipe section so that its opposite end may be moved to an unlocked position. This type of device has the still further disadvantage that it may be used only in connection with circular pipes since such a band on oval or rectangular pipe sections could not be rotated.

In view of the foregoing it is a principal object of the present invention to provide a novel coupling device especially adapted for use in connection with vent pipes, which is designed to overcome the disadvantages mentioned above and yet provide a highly satisfactory means for quickly coupling together adjacent pipe sections.

Another object of the invention is to provide an improved vent pipe section adapted to be secured to other like pipe sections and which is provided with a novel form of coupling arrangement which may be quickly and easily manipulated to couple adjacent pipe sections together.

A further object of the invention is to provide a novel form of vent pipe section wherein one section may be quickly and easily coupled with an adjacent section merely by moving a locking ring in an axial direction.

Still another object of the invention is to provide a vent pipe section with coupling means which include a locking ring adapted for movement in either an axial or a radial direction and when so moved will cause detent means to be moved into locking engagement with a locking groove on an adjacent section.

A still further and more specific object of the invention is to provide a vent pipe section with a locking groove adjacent one end thereof and a plurality of yieldable detent means at the other end thereof which may be moved into locking engagement with the locking groove of an adjacent pipe section when moved radially inwardly by the axial or radial movement of a locking ring normally positioned adjacent the yieldable detents.

Other objects and advantages of the invention will become apparent upon reading the following description taken in conjunction with the accompanying drawings, in which FIG. 1 is an exploded view in perspective of two pipe sections embodying the present invention prior to being coupled together;

FIG. 2 is a perspective view of two pipe sections embodying the present invention shown coupled together and with parts thereof broken away for the sake of clarity;

FIG. 3 is an enlarged fragmentary perspective view, partially in section, of two adjacent pipe sections in assembled relation but prior to being locked together;

FIG. 4 is a view similar to FIG. 3 but showing the two pipe sections coupled together;

FIG. 5 is a horizontal sectional view taken substantially along the plane of line 5—5 of FIG. 2;

FIG. 6 is a view similar to FIG. 5 but showing the invention as applied to an oval-shaped pipe section;

FIG. 7 is a view similar to FIG. 5 but showing the invention as it may be applied to a rectangular pipe section;

FIG. 8 is a fragmentary side elevational view of two pipe sections coupled together wherein a modified form of locking ring is utilized, and FIG. 9 is a horizontal sectional view taken substantially along the plane of line 7—7 of FIG. 8.

As stated hereinabove, the coupling device of the present invention may be used for the purpose of locking together adjacent pipe sections without regard to the use to which the completed pipe is intended to be put, and without regard to whether the pipe sections are single- or double-walled. Inasmuch as the invention has particular application to gas vent pipes which are preferably double-walled, the invention has been illustrated herein in connection with such a pipe section.

Referring now more particularly to the drawings and especially to FIGS. 1 and 2, it will be noted that the invention contemplates the use of a plurality of double walled pipe sections which can be secured together in end-to-end relation to form a complete vent pipe. Each section is identical and in the drawings a pipe section is indicated generally by the numeral 1. Each of these pipe sections is formed with a male end 2 and a female end 3 which is adapted to receive the male end of an adjacent pipe section.

Each pipe section 1 in the illustrated embodiment comprises an outer wall 4 and an inner wall 5 spaced inwardly therefrom. FIG. 3 illustrates more clearly a preferred construction of such a double walled vent pipe. For example, the male end has the inner wall 5 thereof outwardly offset, as at 6, at a predetermined distance from the end thereof and has another outwardly offset portion 7 at a point nearer the end of the section. The outer wall 4 has an inwardly offset portion 8 opposite the offset 6 in the inner wall and then spaced upwardly therefrom the outer wall has formed therein an annular locking groove 9. The outer wall 4 then continues upwardly and is curled over inwardly, as at 10, to enclose the end of the inner wall 5 and secure the two walls together.

The female end of each section is arranged to have the inner and outer walls 5 and 4, respectively, remain in spaced apart condition so as to receive the male end of an adjacent pipe section. As may be seen when FIGS. 1, 2 and 3 are considered together, the outer wall 4 at the female end is curled outwardly, as at 11, and is adapted to come to rest against the shoulder 8 in the outer wall of an adjacent pipe section when two sections are coupled together. The inner wall 5 may be provided with a return bend 12 at the female end thereof and is adapted to terminate against or closely adjacent the offset 6 on the inner wall of an adjacent pipe section when the two sections are coupled together.

A plurality of openings 13 in the outer wall 4 are spaced apart circumferentially around the female end of each pipe section which are adapted to be brought into register with the locking groove 9 adjacent the male end of another pipe section coupled therewith. A locking detent generally indicated by the numeral 14 is struck from the outer wall 4 and extends into each of the openings 13. Each locking detent 14 comprises a tongue 15 extending generally in an axial direction toward the adjacent female end of the pipe section, and has a locking rib 16 formed therein in such position as to be able to be moved inwardly into locking engagement with the locking groove 9 of an adjacent pipe section coupled therewith. Each tongue 15 is yieldable and is so formed with respect to the outer wall 4 as to be positioned normally outwardly of the pipe section so as not to interfere with the free movement of one pipe section into coupling position with an adjacent pipe section.

Thus, when two pipe sections are placed together, they will appear substantially as in FIG. 3 before the two sections have been locked together. It will be clear at this point that when the locking detents 14 are moved inwardly through the openings 13 to a position where the ribs 16 thereon are received by the groove 9 of an adjacent pipe section, the two adjacent pipe sections will be securely locked together. These locking detents may be caused to move inwardly into locking position preferably by means of the suitable movement of a locking band surrounding the pipe section adjacent the female end thereof.

The locking band just referred to may take any suitable form and preferably is one which has an axial sliding movement lengthwise of the pipe section. In the embodiments of the invention disclosed herein one form of the locking band is shown in FIGS. 1 to 7 inclusive, and a modified form thereof is shown in FIGS. 8 and 9. In the form shown in FIGS. 1 to 7 inclusive, the locking band is a continuous ring which may move only in an axial direction. In FIGS. 8 and 9, however, the locking band is split and secured in place by a bolt passing through abutting flanges, whereupon the band may have an axial movement when in a semi-tightened condition or, as will be later pointed out, it may be utilized so that it will have only a radial movement for the purpose of locking two pipe sections together.

In FIGS. 1 to 5 inclusive, the locking band is indicated by the numeral 17 and is positioned adjacent the female end of a pipe section normally in a position above the locking detents 14. It may be desirable to have some means, such as the dimples 18, circumferentially spaced around the band 17 to facilitate the application of the necessary force to slide the band axially of the pipe section.

Viewing FIGS. 1 to 5 inclusive, then, it will become evident that when two adjacent pipe sections are placed in end-to-end relation with the female end of one section receiving the male end of an adjacent section, the relationship between the two sections will be like that shown in FIG. 3. All that is necessary to do for the purpose of locking the two sections together is to slide the locking band 17 downwardly from its present position shown in FIGS. 1 and 3 to the position thereof shown in FIGS. 2 and 4. As the locking band moves downwardly, the lower edge thereof will come against the outwardly positioned locking detents 14 urging them inwardly to a position where the ribs 16 thereon are received within the locking groove 9, whereupon the two sections will be securely locked together and the locking band 17 will have been moved downwardly to the position shown in FIG. 4 where it covers the locking detents. The lower curled edge 11 at the bottom of the female end of the pipe section acts as a stop to limit the downward movement of the locking band and to position it properly for maintaining the two pipe sections in locked relation.

It will thus be evident that a simplified form of means for locking two such pipe sections together has been provided which will effectively lock the two sections in position merely by moving a locking band in an axial direction. This overcomes the disadvantages of the locking bands which require a rotary movement to move the locking means into locking position wherein it is possible that one pipe section may also be rotated inadvertently to an unlocked position, while the band on another pipe section is being moved to locked position.

FIGS. 6 and 7 illustrate further advantages of the locking means of the present invention over those heretofore known. For example, in FIG. 6 the same pipe section as that shown in FIG. 5 is shown except that it is of oval shape instead of circular in cross section. Corresponding parts are similarly numbered but bear a letter after the number to show the similarity of construction. For example, the outer walls of the pipe sections are indicated at 4a and the inner walls at 5a. The annular locking groove formed in the male end of one section is illustrated at 9a and receives the rib 16a of a locking tongue. The tongues are caused to lock the two pipe sections together by axial movement of the locking band 17a in the same manner described above with respect to FIGS. 1 to 4 inclusive.

FIG. 7 illustrates two pipe sections locked together in the same manner described above wherein the pipes have a rectangular cross section. Again, similar identifying indicia are used to indicate similar parts. Thus, the outer wall of each pipe section is indicated at 4b and the inner wall at 5b. The annular locking groove is indicated at 9b with the locking rib 16b received therein and the locking band 17b holding the locking tongues in locking position.

It will thus be seen that the particular form of locking means for locking vent pipe sections together has the additional advantage of being usable in connection with vent pipes having cross sections other than circular, such as for example, oval or rectangular.

Referring now more particularly to FIGS. 8 and 9, the modified form of locking band is illustrated in connection with vent pipes identical with those shown in FIGS. 1 to 5 inclusive. It will be obvious, however, that the locking band shown in FIGS. 8 and 9 will be likewise adapted for use with vent pipes having non-circular cross section, such as oval or rectangular as shown in FIGS. 6 and 7.

In FIGS. 8 and 9 the two pipe sections of FIGS. 1 to 5 are utilized and the same numbers have been used to identify the same parts. The locking band, however, is indicated by the numeral 19 and constitutes a split ring, the ends of which terminate in outwardly extending flanges 20 and 21. The flanges have openings therethrough to receive a bolt 22 which is adapted to have a nut 23 threaded thereon so that the ends of the band 19 may be drawn together and locked in position.

In this embodiment of the invention the locking band 19 may be moved into locking position to force the locking tongues inwardly in either of two ways. The ends of the band 19 may be brought together in a rather semi-tightened condition above the locking tongues 15 and then moved in an axial direction after the two pipe sections have been placed together, thereby to force the locking tongues 15 inwardly to locking position. On the other hand, the locking band 19 may be positioned around the locking tongues 15 initially in an open or relatively loose condition so that after the two pipe sections have been placed together all that is necessary is to tighten the nut 23, thereupon imparting a radial movement to the locking band 19 and urging the locking tongues inwardly to locking position.

Having in mind the foregoing explanation, it will become evident that the term "axial movement" of the locking band is applicable to both forms of the invention shown herein, whereas the term "radial movement" is applicable only to that species of the invention shown in FIGS. 8 and 9.

From the foregoing description it is believed that it will be evident that the invention disclosed herein affords a simple and economical construction of a sectional vent pipe wherein the sections may be quickly and securely fastened together in locked relation. With the present construction, not only have the disadvantages of prior locking devices been overcome, but additional advantages have been gained due to the fact that the device becomes useful in connection with vent pipes having non-circular cross sections.

Changes may be made in the form, construction and arrangement of the parts without departing from the spirit of the invention, and the right is hereby reserved to make all such changes as fairly fall within the scope of the following claims.

The invention is hereby claimed as follows:

1. A pipe section adapted to be coupled with other like pipe sections in end-to-end relation to form a pipe of any desired length, said pipe section comprising a pipe wall having a male coupler at one end and a female coupler at the other end, said male coupler including a continuous outwardly opening locking groove lying in a plane extending normal to the longitudinal axis of the pipe section, said locking groove having side walls extending parallel to said plane, said female coupler including an opening in the pipe wall, a locking detent for said opening movable therethrough between locking and unlocking positions with a locking groove of another pipe section, said locking detent including a relatively flat tongue connected to the pipe wall at one edge of the opening and projecting outwardly of the pipe wall when the detent is in unlocking position, a locking rib on said tongue offset inwardly from the plane of the tongue and having parallel abutment walls adapted to mate with the groove side walls, said locking rib being positioned inwardly of the pipe wall and in mating engagement with said groove when the detent is in locking position, and a locking band having a relatively smooth inner surface and a cross sectional configuration like that of the pipe section and being sized slightly larger thereof for axial slidable movement along the outer surface of the pipe wall, whereby movement of said band into registry with said openings and tongues moves the tongue inwardly and the rib into the locking groove of an adjacent pipe.

2. A pipe section adapted to be coupled with other like pipe sections in end-to-end relation to form a pipe of any desired length, said pipe section comprising a pipe wall having a male coupler at one end and a female coupler at the other end, said male coupler including a continuous outwardly opening locking groove lying in a plane extending normal to the longitudinal axis of the pipe section, said locking groove having side walls extending parallel to said plane, said female coupler including a plurality of openings in the pipe wall arranged along a plane normal to the longitudinal axis of the pipe section, a locking detent for each opening and movable therethrough between locking and unlocking positions with a locking groove of another pipe section, each locking detent including a relatively flat tongue connected to the pipe wall at one edge of an opening and projecting outwardly of the pipe wall when the detent is in unlocking position, a locking rib on each tongue offset inwardly from the plane of the tongue and having parallel abutment walls adapted to mate with the groove side walls, said locking rib being positioned inwardly of the pipe wall and in mating engagement with the groove of an adjacent pipe when the detent is in locking position, and a locking band having a relatively smooth inner surface and a cross sectional configuration like that of the pipe section and being sized slightly larger thereof for axial slidable movement along the outer surface of the pipe wall, whereby movement of said band into registry with said openings and tongues moves the tongues inwardly and the locking ribs into the locking groove of an adjacent pipe section.

3. A double-walled pipe section adapted to be coupled with other like pipe sections in end-to-end relation to form a pipe of any desired length, one end of the section having the walls thereof secured together to form a male end and the other end of the section having the walls thereof spaced apart to form a female end adapted to receive the male end of another section, and coupling means for said section comprising a continuous outwardly opening locking groove at said male end in the outer wall thereof and lying in a plane perpendicular to the longitudinal axis of said section, said groove having side walls paralleling said plane, a plurality of openings in the outer wall at the female end arranged along a plane normal to the longitudinal axis of the section, a locking detent for each opening and movable therethrough between locking and unlocking positions with a locking groove of another pipe section, each locking detent including a relatively flat tongue connected to the pipe wall at one edge of an opening and projecting outwardly of the pipe wall when the detent is in unlocking position, a locking rib on each tongue offset inwardly from the plane of the tongue and having parallel abutment walls adapted to mate with the groove side walls, said locking rib being positioned inwardly of the pipe wall and in mating engagement with the groove of an adjacent pipe when the detent is in locking position, and a locking band having a relatively smooth inner surface and a cross sectional configuration like that of the pipe section and being sized slightly larger thereof for axial slidable movement along the outer surface of the pipe wall, whereby movement of said band into registry with said openings and tongues moves the tongues inwardly and the locking ribs into the locking groove of an adjacent pipe section.

4. A pipe section as defined in claim 3, and said band having means for permitting it to move toward and away from the pipe wall along a plane perpendicular to the longitudinal axis thereof and when moved toward said pipe wall will move the locking detents into locking position.

5. A pipe section as defined in claim 3, wherein said pipe section is cylindrical in cross section.

6. A pipe section as defined in claim 3, wherein said pipe section is rectangular in cross section.

7. A pipe section as defined in claim 3, wherein said pipe section is oval in cross section.

References Cited in the file of this patent

UNITED STATES PATENTS

| | | |
|---|---|---|
| 109,695 | Westinghouse | Nov. 29, 1870 |
| 1,205,131 | Beck | Nov. 14, 1916 |
| 2,490,363 | Lang | Dec. 6, 1949 |
| 2,784,987 | Corcoran | Mar. 12, 1957 |
| 2,851,288 | Kinkead | Sept. 9, 1958 |